United States Patent Office 3,329,845
Patented July 4, 1967

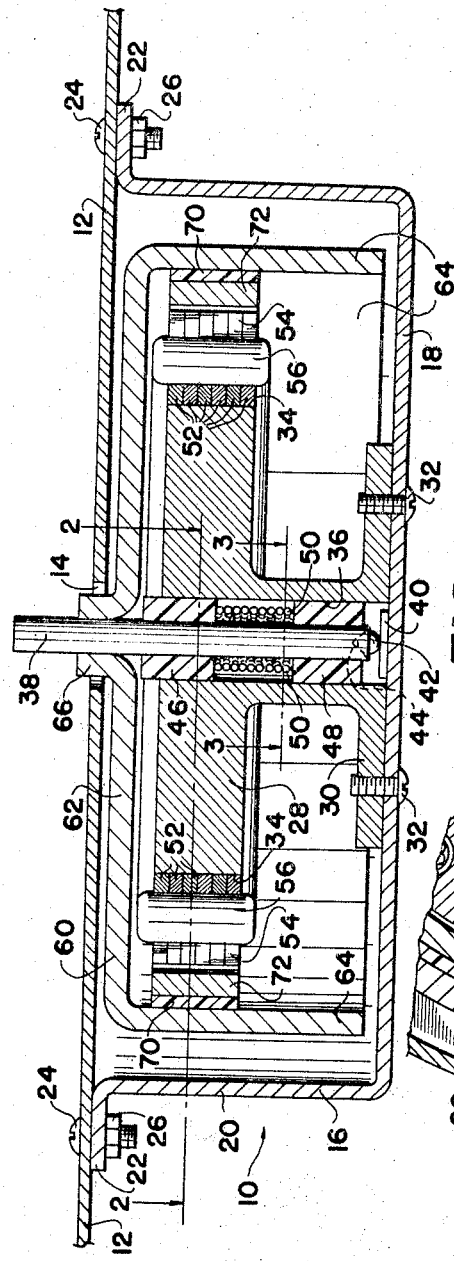

3,329,845
SELF-SHIELDING MOTOR
William P. Lear, Wichita, Kans., assignor to Lear Jet Corporation, Wichita, Kans., a corporation of Delaware
Filed Mar. 16, 1964, Ser. No. 351,915
2 Claims. (Cl. 310—256)

This invention relates to motor or generator means, and in a more specific aspect to a self-shielding motor or generator. In a still more specific aspect the invention relates to the construction of a motor, generator or the like wherein the magnetic field which causes relative rotation between the parts is shielded to eliminate undesirable effects of magnetic flux outside of the capstan motor or generator. In a still more specific aspect the invention relates to motor means for tape recorders, playback apparatus, and other apparatus operating on a magnetic principle wherein the magnetic field of the associated motor is substantially shielded to eliminate interference between the magnetic portions of the motor and the magnetic portions of the associated apparatus.

Various motor and generator construction are known to the art. These include motors or generators associated with magnetically operated apparatus, such as motors for tape recording or playback means. The problem of magnetic interference between the motor or generator and associated structures has long been a problem and in many instances it has become necessary to mount the motor or generator a considerable distance from an associated magnetic apparatus to reduce magnetic coupling between the two devices. However, such remote mounting of the motor in tape recording and playback apparatus produces an undesirable flutter in the reproduced signal when the length of the tape between the capstan and the head is relatively great. Such flutter occurs because of the elasticity of the tap. Therefore, it is desirable to provide a motor or generator which can be mounted closely adjacent the magnetic apparatus and be magnetically shielded therefrom to prevent undesirable magnetic coupling between the motor or generator and the magnetic apparatus.

In accordance with the present invention means for converting mechanical energy to electrical energy or electrical energy to mechanical energy is provided which includes support means and shielding means. A shaft is rotatably mounted relative to the support means and the shielding means is attached to the shaft to rotate therewith. Conductor means are operatively connected to the support means and magnetic means are operatively associated with the shielding means for rotation therewith and positioned close to the conductor means. The shielding means is positioned to enclose at least a portion of the conductor means and the magnetic means.

Accordingly, it is an object of the invention to provide a new motor or generator construction.

Another object of the invention is to provide a new self-shielding motor or generator.

Another object of the invention is to provide a new self-shielding motor or generator which is particularly constructed and adapted for use with magnetically operated apparatus, such as a motor for a tape recorder and playback device or the like.

A still further object of the invention is to provide a new motor or generator construction which is magnetically shielded to prevent stray magnetic fields generated by operation of the motor or generator from reaching adjacent devices which are sensitive to the magnetic fields.

Another object of the invention is to provide a new motor construction particularly constructed and adapted for use as a capstan motor in tape recording device or tape playback device wherein the magnetic field of the motor is substantially shielded from the magnetic head of the device.

Another object of the invention is to provide a new motor for a tape recording or playback device wherein the motor can be mounted closely adjacent the playback head or recording head and thereby eliminate flutter caused by remote mounting of the motor and elasticity of the tape.

Various other objects, advantages and features of the invention will become apparent to those skilled in the art from the following description taken in connection with the accompanying drawings, in which:

FIG. 1 is a cross section view taken through a preferred specific embodiment of a self-shielding motor or generator of the invention.

FIG. 2 is a partial cross section view taken along the view 2—2 of FIG. 1.

FIG. 3 is a cross section view taken on the line 3—3 of FIG. 1.

The following is a discussion and description of a preferred specific embodiment of the new self-shielding motor or generator of the invention, such being made with reference to the drawings whereon the same reference numerals are used to indicate the same or similar part and/or structure. It is to be understood that such discussion and description are to unduly limit the scope of the invention.

Referring now to the drawings in detail, a preferred specific embodiment of the self-shielding motor or generator of the invention is shown generally at 10 and a mounting plate 12 is provided and can be either part of the motor or generator 10 or a part of the apparatus on which the motor or generator is to be mounted. For example, the plate 12 can be a portion of a tape recording or playback apparatus. The plate 12 has a hole 14 therethrough and preferably the hole is circular to receive the shaft as described hereinafter. A motor or generator housing 16 is provided and is preferably generally cup-shaped as shown in the drawings. The housing 16 has a generally circular base portion 18 and an integral generally annular wall 20 located at the periphery of the base portion 18 and projecting therefrom. The wall 20 desirably has a lip portion 22 around the edge thereof opposite from the base 18 and the lip portion 22 can be secured to the mounting plate 12 in any suitable manner, such as by the use of bolts 24 and nuts 26. The housing 16 is desirably made of a magnetic shielding material, such as Mumetal.

A support member 28 is positioned within the housing 16 and desirably has a base portion 30 connected to the base portion 18 of the housing by suitable mounting means, such as the mounting bolts 32. The support member 28 has a circular or cylindrical radially outer edge portion 34 which is positioned between the mounting plate 12 and the base portion 18 of the housing 16 and preferably the support member is mounted so that the edge 34 is substantially coaxial with and spaced from the wall 20 of the housing. The support member preferably has a cylindrical hole 36 through the center portion thereof which is substantially coaxial with the edge portion 34 of the support and is in axial alignment with hole 14 in plate 12.

An elongated rotor shaft 38 is coaxially positioned in the hole 36 in the support member 28 and is of length to project therefrom and through the hole or opening 14 in the mounting plate 12. A bearing plate 40 is preferably provided and mounted on the inner surface of the base portion 18 of the housing 16 and located within the hole 36 in the support member 28. The bearing plate 40 can be constructed of an antifriction material, preferably Teflon which is polytetrafluoroethylene, Kel-F which is polytrifluorochloroethylene, nylon or other suitable plastic materials. A spherical support bearing or ball 42 rests on the bearing plate 40 and is received by a conical recess 44 in an end of the shaft 38. If desired, a slight spherical recess can be provided in the plate 40 to accommodate the ball 42. The ball 42 provides a thrust mounting for the shaft 38, the shaft normally being in a vertical position as illustrated in the drawings when used in tape recording and playback devices. In addition, bearings 46 and 48 can be provided and operatively connected to the rotor shaft 38 and to the support member 28 to rotatably mount the shaft 38 within the support member. The bearings 46 and 48 can be either sleeve bearings or anti-friction bearings having balls, rollers or other antifriction means. Wick members 50 can be provided to connect the bearings 46 and 48 and provide a path for transfer of lubricant to the bearings.

A plurality of thin and generally annular stator laminates 52 are mounted by a press fit or any other suitable manner on the edge portion 34 of the support member 28 and project radially outwardly therefrom. The laminates 52 are preferably constructed of a magnetic material and each desirably has a plurality of slots 54 in the radially outer edge thereof with the slots in adjacent laminates being in axial alignment. An electrical conductor 56 is wound in the slots 54 in the laminates 52 in a usual and common manner. When used as a motor the conductor 56 is connectible to a source of electric current to in operation provide a rotating magnetic field in and around the laminates 52. The field winding can be of any suitable and known type for the particular application of the motor. When the motor is used as a drive motor for a capstan in a tape recording or playback device, the motor is preferably a hysteresis-synchronous motor so that the field created is a result of the applied frequency of the A.C. voltage and thereby eliminate fluctuations in motor speed which might be caused from a fluctuating voltage if of the induction type. In other applications, other common windings can be used. When using the structure of the invention for a generator, the conductor is connected to suitable distribution means for the electrical energy generated.

A rotor 60 is provided and preferably has a circular portion 62 positioned between the support 28 and the mounting plate 12 and an annular wall 64 projects from the outer edge of the portion 62 thereof and the wall 64 preferably extends to a point closely adjacent and spaced from the circular or base portion 18 of the housing 16. The wall 64 of the rotor 60 is also positioned between and in spaced relation to the laminates 52 and the wall 20 of the housing 16. The circular portion 62 of the rotor 60 is firmly attached to the shaft 38 for rotation therewith and preferably the center of the circular portion 62 of the rotor 60 projects axially as shown at 66 and receives the shaft 38. The portion 66 of the rotor can project through the hole or opening 14 in the plate 12 to thereby substantially close the hole 14. Preferably, the rotor 60 is made of a magnetic material having low magnetic retentivity, such as good quality low retentivity magnetic iron. For example, a cobalt alloy consisting of three percent cobalt in iron is satisfactory as is other magnetic material having the desired qualities. The rotor 60 provides very desirable magnetic shielding to prevent the magnetic field of the windings 56 from passing through the rotor and plate 12 to affect associated or related magnetically operated apparatus adjacent the shaft 38, such as a tape recording or playback head. This shielding affect is particularly effective by virtue of the shape and location of the rotor 60, it being apparent from the drawings and description thereof that the portion 66 tightly surrounds the shaft 38, the portion 62 prevents passage of magnetic fields upwardly through the plate 12, and the wall portion 64 substantially shields the side of the motor to prevent passage of magnetic flux through the portion 20 of the housing 16. And, the housing, which is preferably of a magnetic shielding material, aids in shielding the motor or generator in that it prevents passage of magnetic flux through the side portion 20 and center portion 18 thereof.

An annular magnetic insulator 70 of plastic or other suitable materials is secured to the radially inner surface of the wall 64 of the rotor 60 and is positioned adjacent the laminates 52 and preferably the insulator 70 has an axial dimension substantially equal to the axial dimension of the laminates 52. An annular magnetic member 72 is secured to the radially inner surface of the insulator 70 and is positioned closely adjacent and is spaced from the radially outer edges of the laminates 52. The magnetic member 72 preferably has an axial dimension substantially equal to the axial dimensions of the insulator 70 and the plurality of laminates 52.

When using the structure of the invention as a motor, the rotating magnetic field created as a result of passage of electric energy through the coil or windings 56 acts on the magnetic member 72 to cause rotation of the magnetic member 72, the insulator 70 and the rotor 60 which in turn causes rotation of the shafts 38 to drive the mechanism attached thereto. The effect of the magnetic field on the rotor 60 is diminished as a result of the provision of the insulator 70 between the magnetic member 72 and the rotor 60 which aids in obtaining the desirable shielding obtained by the construction of the motor of the invention. When using the structure of the invention as a generator, the shaft 38 is rotated to in turn rotate the magnetic member 72 and produce an electric current in conductor 56.

The structure of the invention is particularly desirable for use as a capstan motor in a tape recording device or tape playback device. In recording and playback devices it is quite desirable that the capstan be positioned closely adjacent the magnetic head which senses the magnetic variations of the tape or the like and which is extremely sensitive to stray magnetic fields and normally cannot be adequately shielded because it must be in contact with the tape or the like. In some instances, attempts have been made to mount the motor at a considerable distance from the magnetic playback head to reduce the magnetic coupling between the two devices. However, such results in undesirable flutter in the reproduced signal which occurs when the length of the tape between the capstan and the tape playback head is relatively great. This occurs because of the elasticity of the tape. With the motor of he invenion, adequate shielding is provided within the motor itself to eliminate undesirable stray magnetic fields being created around the motor which might otherwise affect the tape playback head and thus distort the signal being reproduced or recorded. With the motor of the invention the capstan can be positioned closely adjacent the recording or playback head without the undesirable magnetic interference obtained with prior art motors. As previously indicated, a hysteresis-synchronous motor is desirable for capstan motors since it is a frequency operated motor and the speed of the shaft does not vary with the changing voltage of the input line. However, other type motors or motor windings can be utilized with the motor structure of the invention if desired.

When the motor of the invention is used with tape playback or recording mechanisms, the plate 12 is normally a part of the recording or playback device and is relatively large and for that reason it is not feasible to fabricate the plate from magnetic shielding materials which are normally quite expensive. For example, plate 12 is frequently o cold rolled steel which is not a particularly good magnetic shield. The housing 16, on the other hand, is relatively small and can be made from Mumetal or the like without a substantial increase in cost. Likewise, the rotor 60 is relatively small and use of the materials of the type set forth herein are readily available. The area or space between the support member 28, the wall 64 of the rotor 60, and the base or circular portion 18 of the housing 16 can accommodate electronic components or other apparatus forming a part of the device with which the motor 10 is used or for other equipment.

While the invention has been described in connection with a preferred specific embodiment thereof, it will be understood by those skilled in the art that such is intended to illustrate and not to limit the scope of the invention which is defined by the claims.

I claim:

1. A self-shielding capstan motor for mounting on a mounting plate having a hole therethrough comprising, in combination, a housing constructed of a magnetic shielding material and having a base portion and an integral annular wall projecting from said base portion with the outer edge portion of said wall being connected to said mounting plate, a support member connected to said base portion of said housing and having a circular radially outer edge portion positioned between said mounting plate and said base portion of said housing and coaxial with said wall of said housing, said support member having a cylindrical hole through the center portion thereof in alignmenet with said hole in said mounting plate, an elongated capstan shaft coaxially positioned in said hole in said support member and projecting therefrom and through said hole in said mounting plate, bearing means operatively connected to said shaft and said support member to rotatably mount said shaft in said support member, a plurality of stator laminates mounted on said circular edge portion of said support member, an electrical conductor wound on said laminates and connectible to a source of electrical current to in operation provide a magnetic field, a rotor constructed of a low magnetic retentivity ferromagnetic material and having a circular portion positioned between said support member and said mounting plate with a portion thereof being connected to said shaft for rotation therewith, said rotor having an annular wall positioned between and in spaced relation to said laminates and said wall of said housing with the outer edge portion of said wall of said rotor being adjacent said base portion of said housing, a magnetic insulator secured to the radially inner surface of said wall of said rotor, an annular magnetic member secured to the radially inner surface of said magnetic insulator with the radially inner surface of said magnetic member being positioned adjacent and spaced from said radially outer edges of said laminates, said motor being constructed and adapted so that electrical energy passed through said conductor creates a magnetic field with said magnetic member being rotated by said magnetic field to thereby cause rotation of said rotor and of said shaft, said housing and said rotor providing a magnetic shield to limit influence of the magnetic field outside said housing and said mounting plate.

2. A self-shielding capstan motor comprising a housing constructed of a magnetic shielding material and having a base portion and an integral annular wall projecting from said base portion, a support member connected to said base portion of said housing and coaxial with its said wall, said support member having a cylindrical hole through the center portion thereof, an elongated capstan shaft coaxially positioned in said hole in said support member with an end section projecting beyond said housing for engaging an external magnetic tape, bearing means operatively connected to said shaft and said support member to rotatably mount said shaft therein, a rotor constructed of low magnetic retentivity ferromagnetic material with a disc portion parallel to said housing base portion and connected to said shaft for rotation therewith and with a cylindrical section of said ferromagnetic material extending from said disc portion and positioned between said housing wall and said support member, and electromagnetic means secured respectively on said support member and said rotor cylindrical section, said electromagnetic means being composed of a plurality of laminates of ferromagnetic material with an electrical conductor wound therewith and magnetic means for elecertomagnetic coaction with said wound laminates across an annular air gap, said motor being constructed and adapted so that electrical energy passed through said conductor creates a magnetic field that interacts with said magnetic means to thereby cause rotation of said rotor and said capstan shaft and said housing and rotor provide substantial magnetic shielding of the motor internal magnetic field to the motor outside at said magnetic tape engaging section of said capstan shaft.

References Cited

UNITED STATES PATENTS

| | | | |
|---|---|---|---|
| 2,104,707 | 1/1938 | Rawlings | 310—67 |
| 2,658,157 | 11/1953 | Brouwer | 310—268 |
| 3,059,131 | 10/1962 | Everard | 310—156 |
| 3,111,596 | 11/1963 | Louegrove | 310—156 |
| 3,178,599 | 4/1965 | Krupick | 310—268 |
| 3,179,825 | 4/1965 | Terry | 310—254 |
| 3,231,770 | 1/1966 | Hyde | 310—156 |
| 3,233,132 | 2/1966 | Terry | 310—254 |

MILTON O. HIRSHFIELD, *Primary Examiner.*

J. W. GIBBS, *Assistant Examiner.*